Patented Nov. 24, 1953

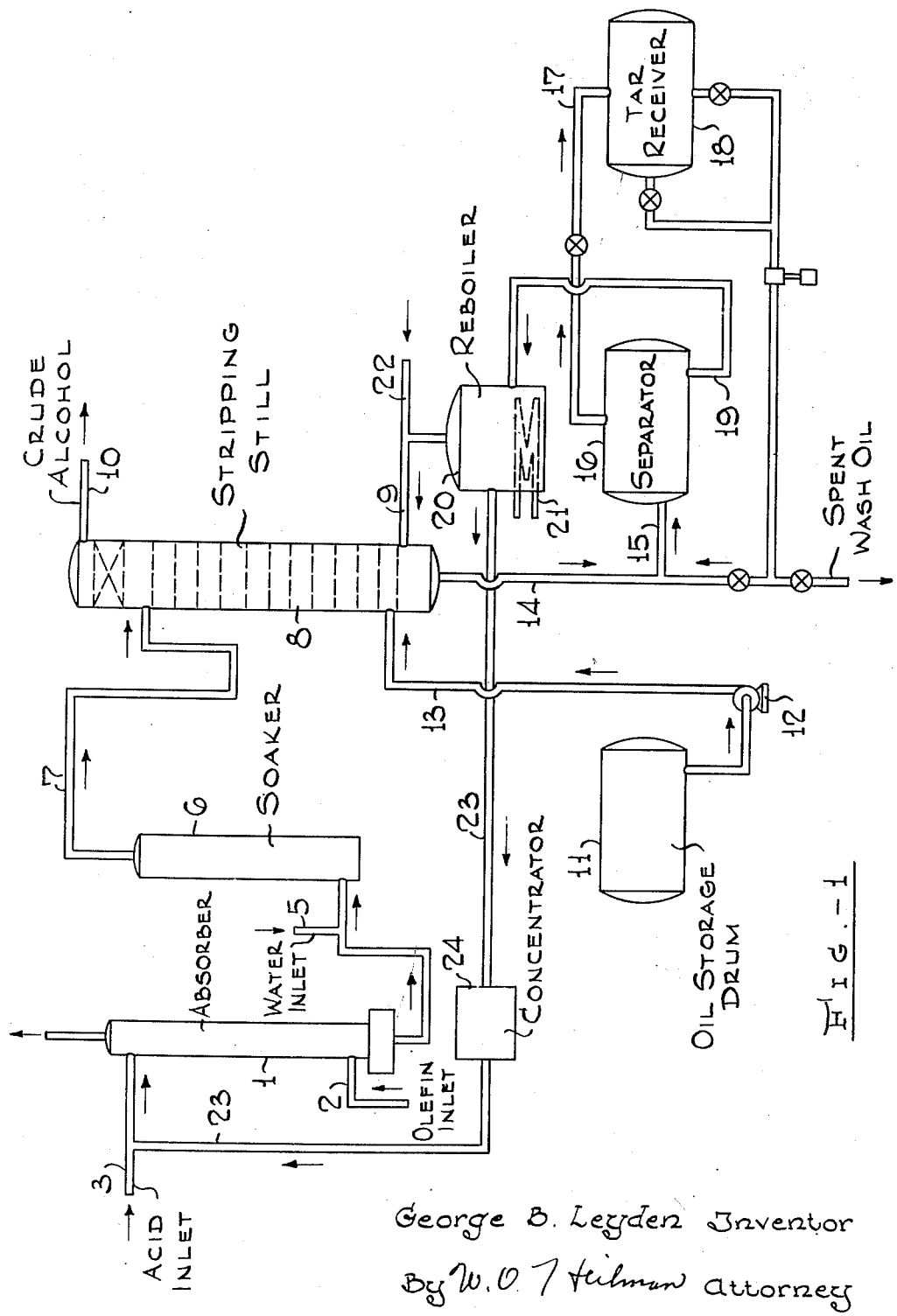

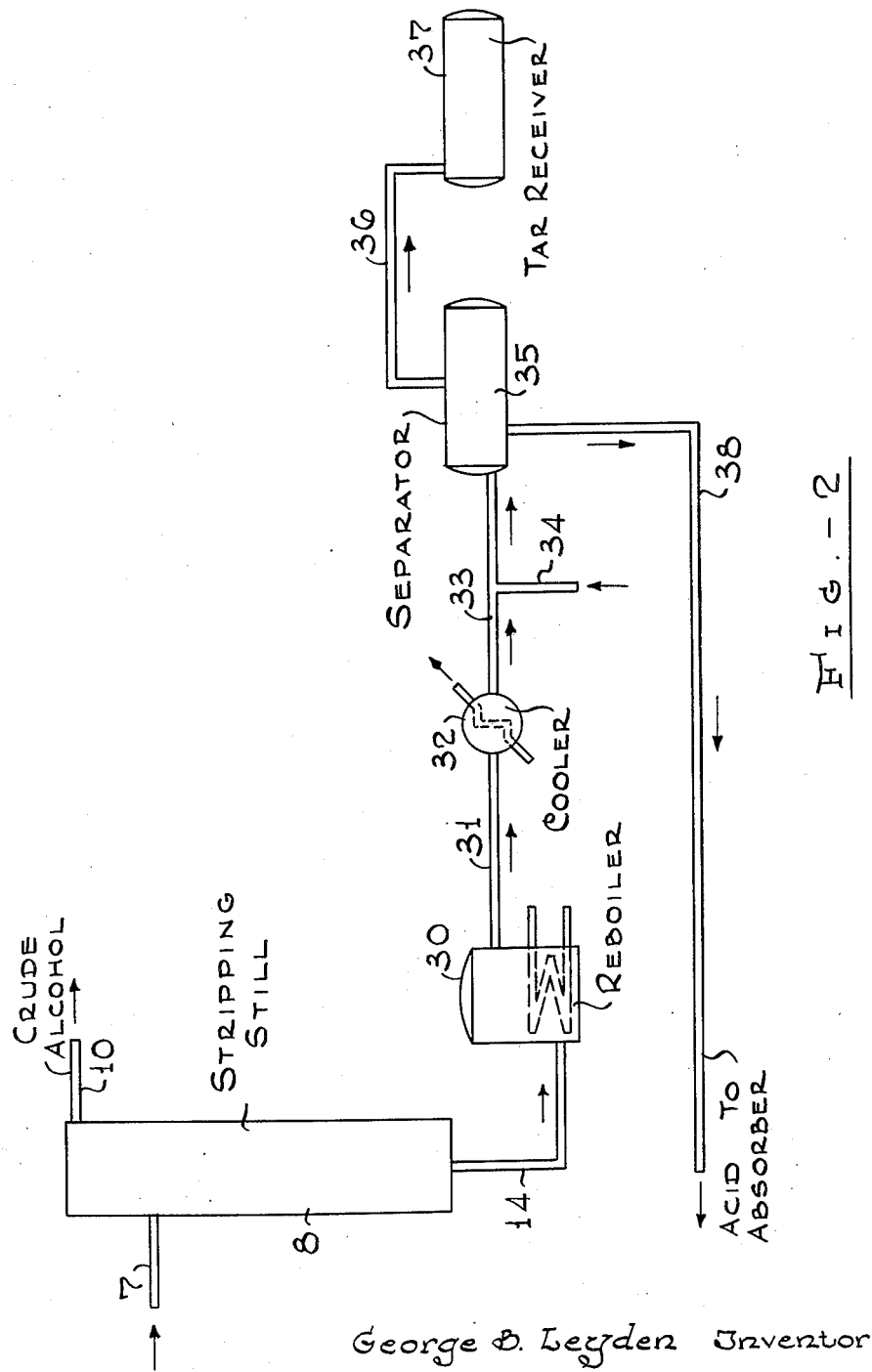

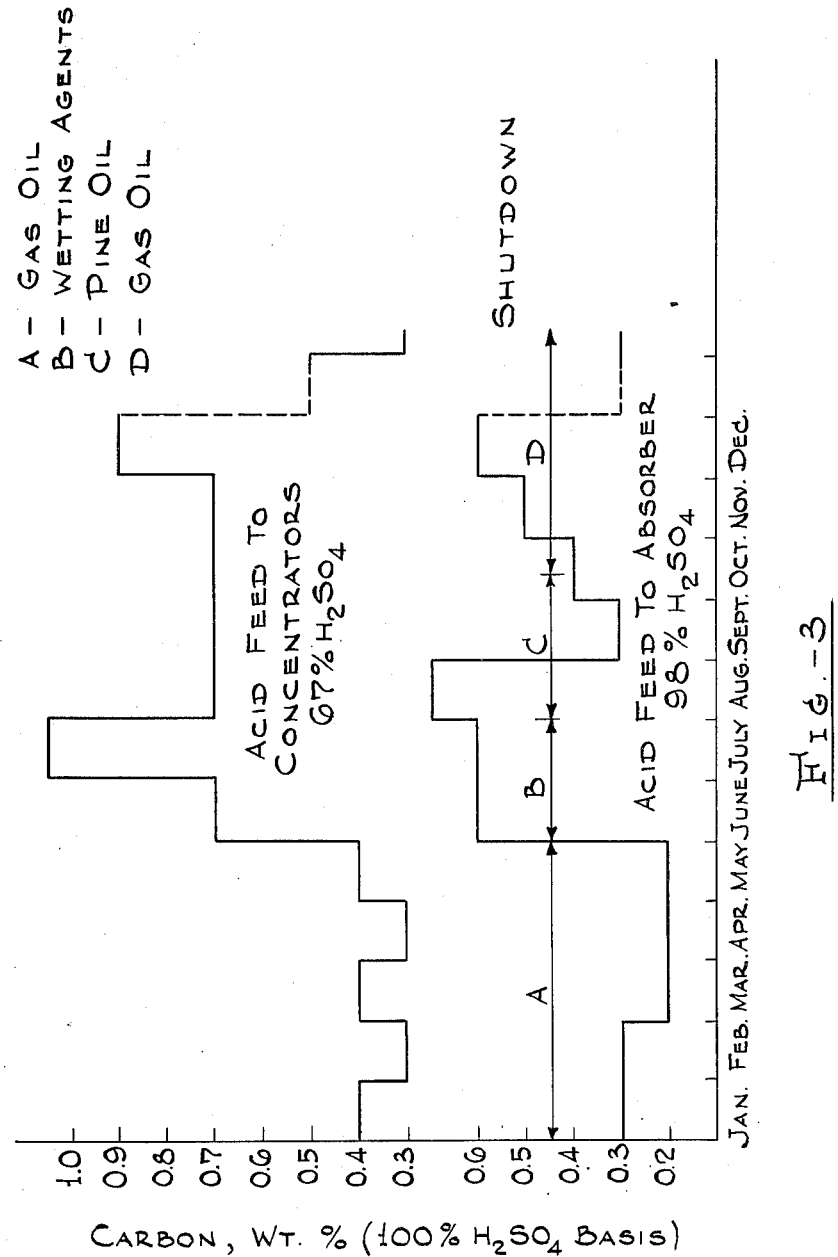

2,660,516

UNITED STATES PATENT OFFICE 2,660,516

SULFURIC ACID RECOVERY

George B. Leyden, Baton Rouge, La., assignor to Standard Oil Development Company, a corporation of Delaware Application January 25, 1950, Serial No. 140,392

3 Claims. (Cl. 23—172)

This invention relates to a process for the removal of suspended carbon from aqueous sulfuric acid solution and relates more particularly to the separation of suspended carbon and other carbonaceous materials from the spent acid obtained in the preparation of alcohol by the sulfation of olefins by decantation with pine oil.

Certain preferred details of operation together with additional advantages will be apparent and the invention itself will be best understood by reference to the following drawings wherein:

Figure 1 is a diagrammatic view in elevation of one embodiment of the invention;

Figure 2 is a diagrammatic view in elevation of another embodiment of the invention;

Figure 3 is a graphical representation of the carbon content of the spent and recovered acids obtained over a period of a year in the plant operation of the present process using various carbon settling oils.

In the manufacture of alcohols from unsaturated hydrocarbons by the use of strong sulfuric acid, a small portion of the unsaturated hydrocarbons is converted to materials which form tars and free carbon when subjected to the high temperatures needed to separate the crude alcohol from the acid. The tar must be removed to make the acid reconcentration equipment operable. If the removal is not complete before the acid is re-concentrated to high strength, the heat then applied causes the acid-soluble material to be decomposed to elemental carbon, which may appear in the concentrated acid as a filterable free carbon or as colloidal carbon. When unsaturated hydrocarbons are esterified with restored sulfuric acid, any colloidal carbon present is gradually precipitated. On dilution of the ester acid extract, the carbon colloid is completely precipitated. A diluted acid extract will contain sufficient quantities of free carbon and resinous materials to lower the efficiency of operation of any subsequent piece of equipment for alcohol or acid recovery. The greatest reduction in efficiency to be expected would be in the acid restoration equipment, through fouling by free carbon. In the past, the separation of tar and carbon has been done by settling in large tanks, and at times by centrifuging. Removal of the less highly polymerized carbonaceous materials by pressure distillation has been attempted. It has also been the practice to bleach the restored acid to remove substantially all elemental and organic carbon prior to use for olefin absorption.

The disadvantages inherent in each of these methods of carbon reduction can be listed as follows:

(1) Bleaching requires the use of alloys resistant to nitric and strong sulfuric acid at high temperatures. The excess nitric acid remaining after bleaching must be removed by the use of ammonia which reacts with the sulfuric acid to form undesirable salts such as ammonium sulfate. In periods of national emergency the difficulty in obtaining and the cost of nitric acid are additional factors to be considered.

(2) Pressure distillation of the weak spent acid on a continuous commercial scale presents operation conditions requiring pumps and lines chemically resistant to hot weak sulfuric acid and having high mechanical strength at elevated temperatures and pressure. The difficulty in overcoming these conditions to the extent necessary for commercial application constitutes a strong objection to its use. Furthermore, suspended carbon is not satisfactorily removed by this process.

(3) Mechanical filtration of the suspended carbon in the weak acid requires special equipment and because of the critical nature of the operation places a heavy demand on operating personnel. For use in a continuous process the operation of two filters set up in parallel is essential so that no interruption of the process would result when washing becomes necessary. Furthermore, corrosion of equipment makes repairs and upkeep costly.

According to this invention suspended elemental carbon is removed from aqueous sulfuric acid solutions by intimately contacting the acid with pine oil, separating the oil layer and withdrawing the acid free of suspended elemental carbon. While the process is applicable to the removal of suspended carbon from any type of dilute sulfuric acid it is particularly applicable to the dilute acid (usually about 45 percent) recovered from the manufacture of ethyl alcohol or to 67% acid concentrated from the 45% acid. In this process an olefinic gas containing about 35% ethylene is treated with about 95% to 100% sulfuric acid which absorbs the ethylene to form sulfuric acid esters. These esters are hydrolyzed with water and steam distilled to recover the ethyl alcohol. The acid is recovered as still bottoms which contain elemental carbon, tars and soluble organic material. According to one embodiment of this invention recovered weak acid is mixed with pine oil and settled to remove the suspended carbon and thus prevent buildup of carbonaceous material in the circulating acid.

The oil used consists of the crude steam distilled pine oil obtained by the distillation of pine wood. The acid may be washed as it flows from the still or it may first be concentrated in atmospheric concentrators to 67% acid and then washed with the oil.

The amount of oil used is determined by the condition of the acid but in general it is found that an amount of oil equivalent to 0.1 to 1.5 volume percent of the weak acid washed is generally sufficient, the settling time decreasing with increased amounts of oil. For example, when using 1 gallon of a pine oil per 100 gallons of acid, 90% of the acid can be settled free of suspended carbon in 15 minutes, 95% in one hour and 98 to 99% in 24 hours.

In general, the process is carried out in the following manner. The oil may be mixed with the acid from the stripping still in an orifice mixer or other suitable intimate mixing equipment and then flowed to a separator where the oil and carbon separate from the acid. The acid is taken off the bottom of the separator clear, ready for storage, or concentration. The oil-carbon layer can be disposed of as desired, as by burning.

Referring now to Figure 1 of the drawing, an olefin gas containing about 35-40% ethylene in an inert diluent is introduced into tower 1 through line 2 and passed countercurrent to sulfuric acid of 97-8% concentration introduced through line 3. In tower 1 the ethylene is absorbed in the sulfuric acid forming ethyl sulfates. The extract thus obtained is removed from the bottom of tower 1 through line 4 where it meets a stream of water introduced through line 5. Sufficient water is added at this point to reduce the acid concentration to 45% calculated on an alcohol and hydrocarbon-free basis. The thus diluted extract is introduced into soaker or mixer 6 where it remains for a sufficient length of time for hydrolysis to occur, the monoethyl sulfates and the diethyl sulfates breaking down into alcohol. The extract is removed from soaker 6 by line 7 and introduced near the top of column 8 at a temperature of about 100° F. This column may be either a packed column or a plate column. The acid extract flows down through the column countercurrent to a stripping medium introduced at the bottom of tower 8 through line 9. In this manner, ethyl alcohol is stripped from the weak acid extract and removed from the top of column 8 through line 10. During this stripping operation free carbon and tar accumulate in the weak sulfuric acid collected near the bottom of tower 8. As pointed out above, if this material is not removed, difficulties will be encountered when reconcentrating the acid. Therefore, according to the present invention, pine oil is introduced from drum 11 by pump 12 and line 13 onto the bottom plate of tower 8 where it contacts the spent sulfuric acid. The mixture of acid and oil is passed through lines 14 and 15 into separator 16 where it is permitted to settle for a period of time sufficient to form two layers, an upper layer consisting of oil and all suspended carbon and a lower layer consisting of acid free from carbon. At the end of the settling time the oil containing the suspended carbon and small quantities of tar and resin are removed through line 17 and stored in tank 18. Recovered sulfuric acid free from suspended carbon is removed from separator 16 through line 19 and introduced into reboiler 20 which is heated by indirect heat exchange with diphenyl vapor in coil 21. By virtue of this operation, the acid is partially concentrated and a portion of the polymers in the sulfuric acid are removed along with steam through line 9 and introduced into the bottom of tower 8 as a stripping medium therein. Additional steam may be added to the stripper if desired through line 22. Reconcentrated sulfuric acid of about 67% strength is withdrawn from reboiler 20 through line 23 and passed to the concentrator 24 where it is concentrated to a strength of 97% and then recycled to absorber 1.

Referring now to Figure 2, there is shown an alternate embodiment of this invention in which the carbon is removed from the spent acid after it has been reconcentrated to about 67% in the reboiler. Accordingly, spent acid is removed from stripping still 8 by line 14 and passed directly to reboiler 30 where it is concentrated at atmospheric pressure to about 67%. This concentrated acid is removed from reboiler by line 31 and cooled in cooler 32 from which it is removed by line 33. Pine oil is introduced into the cooled oil flowing in line 33 by line 34 and the mixture is introduced into separator 35 where it is permitted to settle for a period of time sufficient to form two layers, an upper layer consisting of oil and all suspended carbon and a lower layer consisting of acid free from carbon. At the end of the settling time the oil containing the suspended carbon and small quantities of tar and resin are removed through line 36 and stored in tar receiver 37. Recovered sulfuric acid free from suspended carbon is removed from separator 35 through line 38, further concentrated to 98% and recycled to the adsorber. By virtue of this operation it has been found that washing and settling the more concentrated acid has certain advantages of washing and settling the 45% acid from the stripping still. These advantages are (1) separator 35 is not directly connected with the stripping still and other sections of the alcohol unit and shutting down of the separator does not necessarily shut down the alcohol producing section of the unit. (2) A stronger less corrosive acid and tar is handled which gives better service factors on the equipment unit in the tar separator portion of the unit; (3) by placing separator 35 on the discharge side of the pumps delivering 67% acid from the reboiler more positive pressure is obtained for flowing the acid through the reboilers and coolers; (4) acid flow rates are produced giving better settling time in the equipment; (5) the amount of oil required for settling the carbon is about cut in half.

In Serial No. 590,384, filed April 26, 1945, now Patent No. 2,512,327, dated June 20, 1950, in the name of Albert P. Geraitis and Truman P. Hawes it has been proposed to remove the suspended elemental carbon from the spent sulfuric acid by contacting the acid with a hydrocarbon oil such as a gas oil. This material was found adequate for the purpose for several months in plant use but after a time the carbon was no longer removed from the acid as shown by the data graphically presented in Figure 3 representing a log of the carbon content in the acid fed to the concentrators after separation of carbon by flotation and in the acid fed to the olefin absorber obtained over a period of a year using various carbon settling aids. The graph shows that during the period from January through May the amount of carbon in the acid fed to the concentrators averaged about 0.4% and after concentration and refortification about 0.3%. These figures indicate that during the period essentially all of the solid carbonaceous material was being removed. Beginning in May the solid carbonaceous material was no longer removed by contact with gas oil as indicated by a steady increase in the carbon level of both the acid fed to the absorbers and the acid fed to the concentrators. During June and July sulfonic acids were added to the oil to aid in settling the carbon, but without avail. Finally in July a mixture of pine oil and gas oil was used with the amount of gas oil gradually decreasing until at the end of a few weeks pine oil alone was used. This resulted in a marked decrease in the carbon level. Finally in October the use of pine oil was discontinued and the use of gas oil resumed. This time, however, the acid was first concentrated to 67% before being settled to separate the carbon. Here again the carbon level slowly rose until the plant was shut down for other reasons.

From the above description it is clear that a process has been found whereby the detrimental effects of acid flowing through restoring or stripping equipment due to the presence of suspended elemental carbon and tars and resins present in spent sulfuric acid, from the preparation of alcohols, has been overcome by mixing pine oil with the spent acid and subsequently settling to recover sulfuric acid substantially free from suspended carbonaceous material.

The nature and objects of the present invention having thus been set forth and specific examples of the same given, what is claimed as new and useful and desired to be secured by Letters Patent is:

1. In a process for recovering sulfuric acid from a dilute aqueous sulfuric acid extract obtained by absorbing ethylene in about 95% to 100% sulfuric acid, diluting the extract with water to a lower acid concentration in order to hydrolyze sulfuric acid esters of the ethylene, distilling ethyl alcohol from the diluted extract and producing a spent aqueous sulfuric acid of about 45% to about 67% strength containing free carbon as a bottoms product, the improvement which comprises adding to said spent acid pine oil in an amount equal to about 0.1 to 1.5 volume per cent of the spent acid to flocculate the carbon, settling the thus treated acid to obtain an oil layer containing the carbon particles and an acid layer freed of said carbon particles, and separating said oil layer containing the carbon particles from the acid layer.

2. In a process for recovering sulfuric acid from a dilute sulfuric acid extract obtained by absorbing ethylene in about 95% to 100% sulfuric acid, diluting the acid extract with water to a lower acid concentration, distilling ethyl alcohol from the thus diluted extract to leave as a bottoms product spent acid containing free carbon, and reconcentrating the spent acid to a strength in the range of about 45% to about 67%, the improvement which comprises adding pine oil to said partially reconcentrated spent acid in a relatively small amount equal to about 0.1 to 1.5 volume per cent of the partially reconcentrated acid to flocculate the carbon, settling the thus treated acid to obtain an oil layer containing the carbon particles therein and an acid layer freed of acid carbon particles, decanting the oil containing the carbon, then further concentrating the partially reconcentrated spent acid freed of the carbon particles.

3. A process for recovering sulfuric acid from dilute sulfuric acid extract obtained by absorbing ethylene in 95% to 100% sulfuric acid and diluting with water to about 45% concentration which comprises distilling the acid extract countercurrent to a stripping medium to obtain ethyl alcohol overhead and spent acid containing polymers and free carbon as a bottoms product, adding pine oil to the spent acid in an amount equal to about 0.1% to 1.5% of the spent acid to flocculate the carbon, settling the thus treated acid, decanting the oil in free carbon, concentrating the settled acid to recover overhead vapors as a stripping medium in said alcohol distillation step, and recycling the concentrated acid to the absorption step.

GEORGE B. LEYDEN.

References Cited in the file of this patent

UNITED STATES PATENTS

| Number | Name | Date |
|---|---|---|
| 2,004,084 | Scott | June 4, 1935 |
| 2,055,763 | Greer | Sept. 29, 1936 |
| 2,109,004 | Archibald | Feb. 22, 1938 |
| 2,343,791 | O'Dell | Mar. 7, 1944 |
| 2,512,327 | Hawes et al. | June 20, 1950 |
| 2,629,747 | Fuqua | Feb. 24, 1953 |

FOREIGN PATENTS

| Number | Country | Date |
|---|---|---|
| 9,614 | Great Britain | Aug. 12, 1885 |

OTHER REFERENCES

Hackh's Chem. Dictionary, 3rd ed., 1944, page 231, Grant, The Blakiston Co., Philadelphia, Pa.

Gaudin, "Flotation," 1st ed., McGraw-Hill Book Co. Inc., New York and London, 1932, pages 62–64.